No. 28,743.   PATENTED JUNE 19, 1860.
J. B. DUFF & T. W. KEATING.
MACHINE FOR MEASURING THE STRAIN ON PULLEY BELTS.
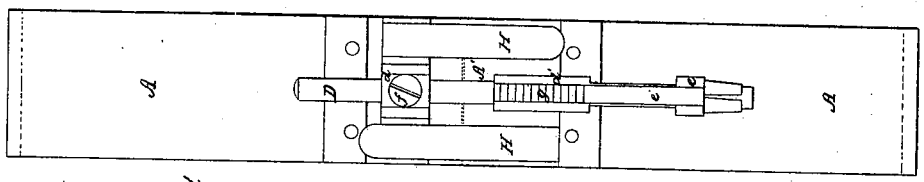
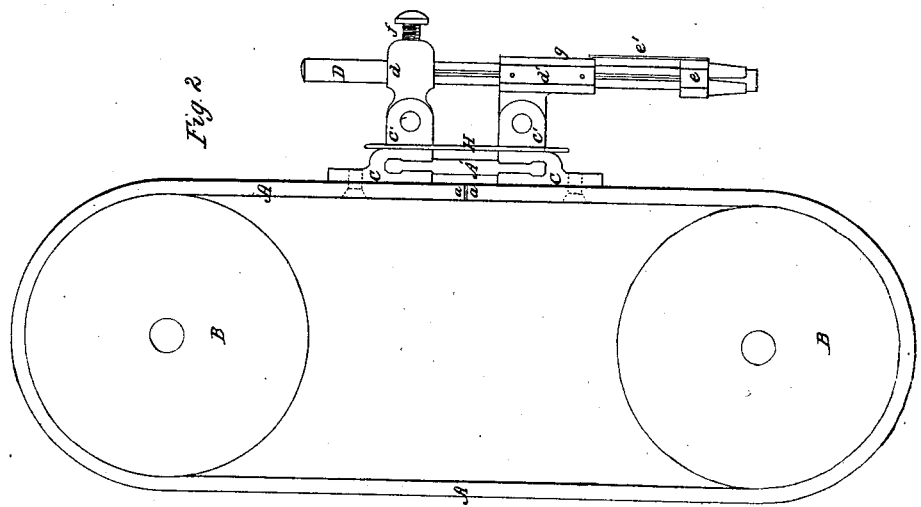

UNITED STATES PATENT OFFICE.

JAMES B. DUFF AND T. W. KEATING, OF NEW YORK, N. Y.

MACHINE FOR MEASURING THE STRAIN ON PULLEY-BELTS.

Specification of Letters Patent No. 28,743, dated June 19, 1860.

*To all whom it may concern:*

Be it known that we, JAMES B. DUFF and THOMAS W. KEATING, of the city of New York, State of New York, machinists, have invented a new and useful invention, being a clasp or instrument for measuring and marking the power excited or used in a pulley-belt or drawing-band passing over driving pulleys or drums, and that the following is a full and exact description of our said invention, reference being had to the drawings accompanying and making part of this our specification.

Figure I is a front view or elevation of our invention as attached to the belt or pulley band. Fig. II is a side elevation of the same.

The same letters represent the same parts in both the figures.

The nature of our invention consists in placing between the ends of the belt an elastic substance, such as india rubber, so that when the belt is in use and in motion the strain upon the belt will indicate the power upon the pulley which the belt drives, the elastic material having been strained by an ascertained weight so as to show the number of pounds at any degree of tension of the elastic substance by means of an indicator arranged as hereinafter described.

In Fig. II, A is the driving belt passing over the two pulleys B, B. The ends of the belt (usually fastened by thongs) are seen at $a, a$. Upon the outside of the belt near to the ends are attached firmly the two parallel horizontal arms $c, c$, which are hinged or jointed at $c', c'$, so as to allow the required play while passing the pulleys.

Into the arms $c, c$, is firmly inserted the india rubber or other material A', of about the same width as the belt, so as to face the line where the belt is divided, and so as to connect the two ends together through the arms $c, c$. The hinged parts, $c, c$, are constructed, the upper one with a bush $d$, the lower one with a sleeve $d'$, in which is a vertical rod D, adjustable in $d$, by the screw and nut $f$, and loose or sliding in $d'$. The lower part of D, is a hollow tube split into quarters, upon and over which so as to stay at any point, is placed the slide $e$, which has fast to it the vertical indicator $e'$.

Upon the outside of the stem $d'$, is a scale with dividing lines upon it, so that the top or indicator $e'$, will pass over the lines, when the indicator is moved. The slide $e$, is set close under the sleeve $d'$, that is as high up as it will go, before the belt is put in motion.

By this arrangement of connecting the ends of the belt, and setting the indicator and slide, it is plain that the tension of the belt will be known by the straining of the elastic material A, and that as this stretches the rod D, will slide upward through $d'$, and the indicator $e'$, will mark the amount of the tension on the scale, and will remain at the point of greatest tension after the belt is stopped.

It is to be observed that there will be a certain degree of action upon the clasp and the indicator, by the curve given to the clasp in simply passing over the pulley; this amount as marked by the indicator should be ascertained by running the clasp once around the pulley, and deducted from the whole amount indicated upon the indicator.

Upon the outside of the clasp are fixed two parallel guide pieces H, H, one end of which only is fastened to the clasp, leaving the other opposite ends loose; they are placed so as to play on either side of the arms $c, c$, and prevent any lateral strain or twist of the elastic material A'.

The weight required to stretch the elastic material A', is ascertained by experiment; and the slide $e$, and the indicator $e'$, adjusted upon the rod so as to mark the weight upon the scale $g$. To determine the power and reduce it to horse-power, the weight is to be multiplied by the velocity of the belt, per minute, and divided by 33,000, and the quotient will be the horse-power exacted by the belt upon the pulley.

It is not intended that the clasp will be permanently used upon the belt, but only when it may be necessary to ascertain and measure the power it exerts. At other times the clasp should be removed and the end of the belt fastened by thongs in the usual manner.

Having thus described our invention, what we claim therein and for which we desire Letters Patent is—

The uniting the ends of the belt by an elastic material placed on a clasp, or fixture constructed with arms attached to the belt, and indicator and scale, in the manner and for the purposes described.

JAS. B. DUFF.
THOS. W. KEATING.

Witnesses:
J. B. STAPLES,
GEO. W. FOX.